United States Patent [19]

Barthel

[11] Patent Number: 4,481,121
[45] Date of Patent: Nov. 6, 1984

[54] VISCOSIFIER FOR OIL BASE DRILLING FLUIDS

[75] Inventor: Horst K. F. Barthel, Suessen, Fed. Rep. of Germany

[73] Assignee: Hughes Tool Company, Houston, Tex.

[21] Appl. No.: 617,141

[22] Filed: Jun. 4, 1984

Related U.S. Application Data

[63] Continuation of Ser. No. 379,199, May 17, 1982, abandoned.

[51] Int. Cl.³ .................................................. C09K 7/06
[52] U.S. Cl. ............................... 252/8.5 M; 252/8.5 P
[58] Field of Search ............... 252/8.5 M, 8.5 P, 315.4

[56] References Cited

U.S. PATENT DOCUMENTS

| | | | |
|---|---|---|---|
| 1,976,780 | 10/1934 | Grant | 252/315.4 X |
| 2,056,594 | 10/1936 | Ambrose | 252/315.4 X |
| 2,209,591 | 7/1940 | Barnes | 252/8.5 |
| 2,233,382 | 2/1941 | DeGroote et al. | 252/8.55 |
| 2,584,930 | 2/1952 | Shinouda | 252/8.5 |
| 2,597,085 | 5/1952 | Larsen | 252/8.5 |
| 2,702,787 | 2/1955 | Freeland | 252/8.5 |
| 2,782,163 | 2/1957 | Wilson | 252/8.5 |
| 2,930,755 | 3/1960 | Crittondon | 252/8.5 |
| 3,168,475 | 2/1965 | Jordan et al. | 252/8.5 |
| 3,314,489 | 4/1967 | Humphrey | |
| 3,379,650 | 4/1968 | Beasley et al. | 252/308 |
| 3,528,914 | 9/1970 | Darley | 252/8.5 |
| 3,642,623 | 2/1972 | Bennett et al. | 252/8.5 |
| 3,671,427 | 6/1972 | Andrews et al. | 252/8.5 |
| 3,671,428 | 6/1972 | Kim | 252/8.5 |
| 3,709,819 | 1/1973 | Browning et al. | 252/8.5 |
| 3,738,934 | 6/1973 | Browning et al. | 252/8.5 |
| 3,956,142 | 5/1976 | Wilson et al. | 252/8.5 |
| 4,235,728 | 11/1980 | Schulz et al. | 252/8.5 |

*Primary Examiner*—Herbert B. Guynn
*Attorney, Agent, or Firm*—Robert A. Felsman; Charles D. Gunter, Jr.

[57] ABSTRACT

A viscosifier for an oil base drilling fluid of the type used in well drilling and workover procedures is shown which comprises an effective amount of a montan wax dispersed within the fluid to provide the needed viscosity and gel strength to properly suspend solids in the drilling fluid. Montan wax is dispersed in an oil base which contains as little as about 5 volume percent water. A basic material, such as lime, reacts in the water with the montan wax, and the partial saponification which results produces a thixotropic drilling fluid.

6 Claims, No Drawings

VISCOSIFIER FOR OIL BASE DRILLING FLUIDS

This application is a continuation of application Ser. No. 379,199, filed May 17, 1982, now abandoned.

BACKGROUND OF THE INVENTION

The present invention relates generally to drilling fluids and specifically to a viscosifier for oil base drilling fluids of the type used in well completion and workover operations.

During the drilling of oil and gas wells, drilling fluid is circulated in the well bore to cool and lubricate the drill bit and pipe, to carry cuttings from the bottom of the well bore to the surface, and to impose a hydrostatic head on the drilled formation to prevent the escape of oil, gas, or water from the well bore.

The term "oil base drilling fluid" is applied to drilling fluids in which oil is the continuous phase and water, if present, is the dispersed phase. An oil base fluid or mud commonly comprises blown asphalt and usually a small amount of water emulsified into the system with caustic or lime and emulsifying agents. The dispersed asphalt increases the density of the oil and provides needed viscosity and gel strength to properly suspend weighting materials, cuttings, and other solids in the fluid.

SUMMARY OF THE INVENTION

A viscosifier for an oil base drilling fluid is shown which comprises an effective amount of a montan wax dispersed within the fluid to provide the needed viscosity and gel strength to properly suspend solids in the drilling fluid.

An oil base drilling fluid composition is also shown which includes an oil base fluid, a montan wax, a basic material capable of forming a soap with the montan wax, and water. The partial saponification which results from the reaction of the fatty acids in the montan wax and the basic material produces a thixotropic drilling fluid and insures a good dispersion of wax particles in the oil base fluid.

Preferably the montan wax has a melting point in the range of about 76° to 120° C., an acid number and a saponification number greater than about 100 and is present in the range of about 5 to 20 pounds per barrel of drilling fluid composition. The basic material is preferably lime and is present in the range of about 2 to 10 pounds per barrel of drilling fluid composition. Water can be present as a saturated brine solution containing 250,000 to 300,000 ppm calcium chloride salt and is used in the range of about 5 to 25 percent by volume of the drilling fluid composition. The oil base fluid is present in the range of about 95 to 75 percent by volume of the drilling fluid composition. Emulsifying additives and a small amount of pentaerythritol and stearic acid can also be added for improved dispersion.

Additional objects, features, and advantages will be apparent in the written description which follows.

DETAILED DESCRIPTION OF THE INVENTION

The oil base drilling fluid composition of the present invention includes an oil base fluid, montan wax, a basic material capable of forming a soap with the montan wax and a small amount of water.

The oil base fluid suitable for use in the present drilling fluid composition can be any crude or refined hydrocarbon or mineral oils conventionally used in the drilling arts, for example diesel oil, crude oil, gas oil, and the like. Since the present composition can be formulated without dispersed asphalt particles, other oils including turpentine, cotton seed oil, whale oil, tall oil, tall oil esters, linseed oil, and other animal or vegetable oils can be utilized. A suitable refined hydrocarbon oil useful in practicing the invention in diesel oil no. 00. A suitable vegetable oil is the tall oil ester marketed as "Arizona 208" by the Arizona Chemical Company of Wayne, N.J. "Arizona 208" is a light-colored isooctyl mono-alcohol ester of a high purity tall oil fatty acid and has a specific gravity of 0.8715 at 25° C., an acid value of 1.0 or less, a refractive index of 1.4605 at 20° C., and a flash point of 435° F.

The oil base fluid is present in the composition in the range of about 95 to 75 percent by volume of the drilling fluid depending upon the volume of water used.

Water can be present in the drilling fluid composition as either sweet water or brine. Preferably the water is present as a saturated calcium brine having a calcium chloride content of 300,000 to 350,000 ppm, although other brine solutions can be used. Water can be present in the drilling fluid composition is in the range from about 5 to as high as about 45 percent by volume of the drilling fluid composition, it being understood that the higher the water content of the composition, the greater the danger of water contamination of water sensitive formations. The water content of the composition is preferably about 5 to 25 volume percent with the most preferred range being about 5 to 10 volume percent, most preferably 7 volume percent of the drilling fluid composition. A small amount of water is necessary in order to allow the basic material and fatty acids in the montan wax to saponify.

The wax component utilized in the drilling fluid composition as a viscosifier is a wax having a melting point in the range of about 76° to 120° C. and having an acid number and a saponification number greater than about 100. The preferred wax must exhibit a melting point in the desired range to allow the wax to be ground to a powder without melting and must have an acid and saponification number in the desired range which indicates the ability to form a soap in the presence of a basic material such as lime. Preferably, the wax is a montan wax either crude or refined having an acid number in the range of about 135 to 175, having a saponification number in the range of about 155 to 175, and having a substantial free acid and alcohol content. The montan wax can also be mixed with resin or petroleum waxes as long as the requisite melting point and free acid and alcohol content is maintained.

Montan wax is a bituminous wax, occuring in brown coals or lignites from which it can be extracted. The coal is generally granulated, dried, and solvent extracted with benzene/alcohol to remove the wax. The crude wax can then be further refined as by vacuum distillation using steam. Another refining process which is commonly employed involves deresinification by solvent processing and then treatment by chromic acid oxidation.

Montan wax either crude or refined exhibits the desirable properties of a high melting point and high free acid content. Crude montan wax is dark brown in color and melts at about 82° C. It is primarily an ester wax, having as much as 60 percent esters but has substantial free acid content which is likely to exceed 15 percent of the total and a free alcohol content of 1 to 2 percent.

The range of carbon numbers for the alcohols and acids, free or combined, is generally in the range of $C_{22}$ to about $C_{34}$ with $C_{26}$, $C_{28}$ and $C_{30}$ predominating.

The preferred montan wax is commercially available from Hoechst Aktiengesellschaft, Augsburg, West Germany as "Saurewachse S". "Saurewachse S" is a montan wax having a melting point in the range of 81° to 87° C., an acid number in the range of 135 to 155, a saponification number in the range of 155 to 175, and a density in the range of 1.00 to 1.02. The wax component is present in the drilling fluid composition in the range of about 5 to 30 pounds per barrel, preferably in the range of about 5 to 20 pounds per barrel, with the most preferred amount being about 10 pounds per barrel.

The oil base drilling fluid composition also includes as one component, a basic material capable of forming a soap with the free acids in the montan wax in the same way that naphthenic acid in asphalt forms a soap with lime. Such basic materials in addition to lime which is the preferred basic material include alkali metal hydroxides such as, for example, sodium hydroxide, potassium hydroxide, and alkaline earth oxides and alkaline earth hydroxides such as calcium hydroxide. Other basic materials which are capable for forming a soap with the fatty acids present in the montan wax include water soluble amines including diethanolamine, and the like.

The basic material is present in the range of about 2 to as much as about 40 pounds per barrel of drilling fluid composition. The preferred range is about 2 to 10 pounds per barrel with the most preferred amount being about 5 pounds per barrel. Although amounts in excess of about 10 pounds per barrel can be used, such material generally exists as excess solids in the drilling fluid composition.

Various additives and enhancing materials of the type known in the drilling arts can be employed with the present drilling fluid composition such as weighting materials, emulsifying additives, wetting agents, extenders such as gilsonite, and the like. Weighting materials which are compatable with the present drilling fluid composition include barite, ilmenite, calcium-carbonate, iron oxide and lead sulfide.

An emulsifying additive can be added to the drilling fluid composition in order to maintain the desired properties of oil wet dispersed solids under borehole conditions and to stabilize the fluid against contamination with water soluble alkaline earth salts and the like. A suitable emulsifier is described in U.S. Pat. No. 3,642,623 to Robert B. Bennett et al issued Feb. 15, 1972, entitled "Oil Base Well Drilling Fluid Composition And Method". The emulsifier there described is a two component system made up of a water soluble acid blocked alkanolamide nonionic surfactant, a sulfonated acid anionic surfactant and an oil soluble nonionic ethoxylated alkyl phenol. The emulsifying additive can generally be used in the range of about 1 to 10 pounds of additive per barrel of drilling fluid composition depending upon the concentration of water in the discontinuous water phase. At a water content of 5 percent by volume, about 1 pound per barrel of additive is sufficient while about 10 pounds per barrel of additive are needed with concentrations of 25 percent by volume water. Of course, greater amounts can be provided in the drilling fluid when the particular oil base drilling fluid being treated is contemplated for use under conditions of severe calcium salt concentration or high temperature and pressure.

The oil base drilling fluid composition can also contain a small amount of a polyhydric alcohol, such as pentaerythritol and/or a fatty acid such as stearic acid which can be esterified to produce emulsifying agents. Preferably, pentaerythritol is present in the range of about 0.5 to 10 pounds per barrel of drilling fluid composition, most preferably about 2 to 5 pounds per barrel and stearic acid is present in the range of about 0.5 to 10 pounds per barrel, most preferably about 2 to 5 pounds per barrel.

The method of preparing an oil base drilling fluid composition of the present invention will now be described. In formulating the drilling fluid composition, the oil, basic material, ground wax particles, emulsifier, and pentaerythritol are first placed in a mixing container and stirred for approximately 20 minutes. The water is then added and stirred for 20 minutes. The weighting materials, if present, are then added and stirred for 20 minutes.

In order to better illustrate the invention, the following specific examples are given, but it is to be understood that the invention is not to be limited to the specific details thereof:

EXAMPLE 1

| Component | Amount |
|---|---|
| 1. Diesel oil | 175 milliliters |
| 2. Lime | 5 grams |
| 3. Montan wax (crude) | 5 grams |
| 4. Montan wax (bleached with melting point of 110° C.) | 10 grams |
| 5. Emulsifying Additive | 15 grams |
| 6. Pentaerythritol | 3.5 grams |
| 7. Brine (saturated solution containing 350,000 ppm $CaCl_2$) | 35 milliliters |
| 8. Barite weighting material | 775 grams |

Components 1-6 were added to a mixing container and stirred for 20 minutes. Component 7 was then added and stirred for 20 minutes. Component 8 was then added and stirred for 20 minutes. The emulsifying additive used was P-N-dodecyl-benzol-sulfonic-acid-N, N-bis(2-hydroxyethyl)-amide. Testing was then carried out to determine plastic viscosity, yield point, 10 second-10 minute gel strength, and electrical stability using the procedures contained in American Petroleum Institute Publication APIRP 13B dated April, 1978. The drilling fluid composition then underwent static aging at 500° F. and 6000 psi pressure ($CO_2$ gas). The test results are shown in Table I:

TABLE I

| | BEFORE STATIC AGING | AFTER STATIC AGING |
|---|---|---|
| Fann, 175° F. | | |
| Plastic Viscosity, c.p.s. | 67 | 61 |
| Yield point p.c.s.f. | 22 | 21 |
| 10"-10' gel strength, p.c.s.f. | 7/13 | 13/21 |
| Electrical stability, volts | 2000+ | 2000+ |
| Mud weight, p.p.g. | 20.2 | |

The electrical stability indicates the breakdown voltage of the emulsion and hence is a measure of strength of the emulsion. A stability of over at least about 400 volts is considered satisfactory. The new drilling fluid composition is electrically stable before and after static aging at simulated borehole conditions of temperature and pressure. No settling of the drilling fluid composition was observed either before or after static aging. The plastic viscosity, yield point and gel strength are all within acceptable range.

EXAMPLE 2

| Component | Amount |
| --- | --- |
| 1. Diesel oil | 175 milliliters |
| 2. Diethanolamine | 15 grams |
| 3. Montan wax (crude) | 5 grams |
| 4. Montan wax (bleached with melting point of 110° C.) | 10 grams |
| 5. Pentaerythritol | 3.5 grams |
| 6. Emulsifying Additive | 15 grams |
| 7. Brine (saturated solution containing 350,000 ppm CaCl$_2$) | 35 milliliters |
| 8. Barite weighting material | 775 grams |

Components 1–6 were added to a mixing container and stirred for 20 minutes. Component 7 was then added and stirred for 20 minutes. Component 8 was then added and stirred for 20 minutes. The emulsifying additive used was P-N-dodecyl-benzol-sulfonic-acid-N, N-bis(2-hydroxyethyl)-amide. Diethanolamine was substituted for lime as the basic material. Testing was then carried out before and after static aging at 500° F. and 12,000 psi pressure ($CO_2$ gas), and after hot rolling at 550° F. for 16 hours. The test results are shown in Table II:

TABLE II

| | BEFORE STATIC AGING | AFTER STATIC AGING | AFTER HOT ROLLING |
| --- | --- | --- | --- |
| Fann, 175° F. | | | |
| Plastic Viscosity, c.p.s. | 79 | 94 | 70 |
| Yield Point, p.c.s.f. | 67 | 30 | 25 |
| 10"-10' gel strength, p.c.s.f. | 30/46 | 11/39 | 7/47 |
| Electrical Stability, volts | 2000+ | 2000+ | 2000+ |
| Mud weight, p.p.g. | 19.5 | | |

The drilling fluid composition is electrically stable before and after static aging and after hot rolling at 550° F. for 16 hours. No settling of the composition was observed before or after static aging and hot rolling.

EXAMPLE 3

| Component | Amount |
| --- | --- |
| 1. Diesel oil | 300 milliliters |
| 2. Lime | 5 grams |
| 3. Montan wax (crude) | 5 grams |
| 4. Montan wax (bleached with melting point of 110° C.) | 15 grams |
| 5. Pentaerythritol | 2.5 grams |
| 6. Emulsifying Additive | 15 grams |
| 7. Stearic Acid | 3 grams |
| 8. Gilsonite | 15 grams |
| 9. Brine (saturated solution containing 350,00 ppm CaCl$_2$) | 35 milliliters |
| 10. Barite weighting material | 300 grams |

Stearic acid was added as a wetting agent. Gilsonite was also used as an extender material. Components 1–8 were added to a mixing container and stirred for 20 minutes. Component 9 was then added and stirred for 20 minutes. Component 10 was then added and stirred for 20 minutes. The same emulsifying additive was used.

Testing was then carried out before and after static aging at 300° F. and 500 psi and after hot rolling at 550° F. for 16 hours. The test results are shown in Table III:

TABLE III

| | AFTER STATIC AGING | AFTER HOT ROLLING |
| --- | --- | --- |
| Fann, 175° F. | | |
| Plastic Viscosity, c.p.s. | 16 | 16 |
| Yield Point, p.c.s.f. | 8 | 8 |
| 10"-10' gel strength, p.c.s.f. | 8/11 | 5/9 |
| Electrical Stability, volts | 2000+ | 1650 |
| Mud weight, p.p.g. | 14.2 | |

EXAMPLE 4

| Component | Amount |
| --- | --- |
| 1. Diesel oil | 300 milliliters |
| 2. Diethanolamine | 2.5 grams |
| 3. Montan wax (crude) | 5 grams |
| 4. Montan wax (bleached) | 115 grams |
| 5. Emulsifying Additive | 15 grams |
| 6. Stearic acid | 3 grams |
| 7. Gilsonite | 5 grams |
| 8. Brine (saturated solution containing 350,000 ppm CaCl$_2$) | 35 milliliters |
| 9. Barite weighting material | 300 grams |

Components 1–7 were added to a mixing container and stirred for 20 minutes. The same emulsifying additive was used. Component 8 was then added and stirred for 20 minutes. Component 9 was then added and stirred for 20 minutes. Testing was then carried out before and after hot rolling at 550° F. for 16 hours. The test results are shown in Table IV:

TABLE IV

| | BEFORE HOT ROLLING | AFTER HOT ROLLING |
| --- | --- | --- |
| Fann, 175° F. | | |
| Plastic Viscosity, c.p.s. | 265 | 32 |
| Yield Point, p.c.s.f. | 8.0 | 7.0 |
| 10"-10' gel strength, p.c.s.f. | 10/17 | 10/17 |
| Electrical Stability, volts | 2000+ | 1400+ |
| Mud weight, p.p.g. | 14.2 | |

EXAMPLE 5

| Component | Amount |
| --- | --- |
| 1. Diesel oil | 175 milliliters |
| 2. Diethanolamine | 15 grams |
| 3. Montan wax (crude) | 15 grams |
| 4. Emulsifying Additive | 15 grams |
| 5. Pentaerythritol | 3 grams |
| 6. Stearic acid | 3.5 grams |
| 7. Brine (saturated solution containing 350,000 ppm CaCl$_2$) | 35 milliliters |
| 8. Barite weighting material | 885 grams |

In this example, only crude montan wax was used. Components 1–6 were added to a mixing container and stirred for 20 minutes. The same emulsifying additive was used. Component 7 was then added and stirred for 20 minutes. Component 8 was then added and stirred for 20 minutes. Testing was then carried out before and after hot rolling at 550° F. for 16 hours. The sample was then hot rolled again at 550° F. for 60 hours. The test results are given in Table V:

TABLE V

| | BEFORE HOT ROLLING | AFTER HOT ROLLING FOR 16 HOURS | AFTER HOT ROLLING FOR 76 HOURS |
|---|---|---|---|
| Fann, 175° F. | | | |
| Plastic Viscosity, c.p.s. | 63 | 59 | 49 |
| Yield Point, p.c.s.f. | 19 | 17 | 12 |
| 10"-10' gel strength, p.c.s.f. | 6/12 | 6/15 | 5/10 |
| Electrical Stability, volts | 450 | 1600 | 700 |
| Mud weight | 19.5 | | |

There was no settling either before or after hot rolling. There was no top settling.

An invention has been provided with significant advantages. The montan wax viscosifier can be used to provide a drilling fluid composition with low solids content since blown asphalt is not used. That is, the wax component of the present compositions disperses in diesel oil to a particle size of 5-10 Å. Blown asphalts have a particle size in the range of 500-550 Å. The present wax-diesel oil composition is therefore closer in behavior to a true Neutonion fluid, thus allowing a faster drilling rate in the well bore. In addition, some wells can be drilled without weighting materials in the drilling fluid, and even more closely approach Neutonion fluid behavior. The partial saponification taking place by reaction of the fatty acids in the montan wax and the lime or basic material produces a thixotropic fluid which gives a good dispersion of solids, i.e., drilling cuttings, weighting material, etc., in the drilling fluid composition. The soap formed is stable at borehole temperature and pressure conditions in the range of 500° F. and 12,000 psi, and higher. The wax molecules which are dispersed in the drilling fluid composition are larger than the pores of the filter cake which is formed on the well bore, thus reducing fluid loss through the filter cake to the surrounding formation. A typical fluid loss measurement at 300° F. and 500 psi was 8 milliliters in 30 minutes.

The present drilling fluid composition is not limited to use with diesel oils of specific expected aniline points which correspond to the melting point of the asphaltines used. As a result, non-polluting vegetable and mineral oils can be used to formulate the drilling fluid composition. The new montan wax drilling fluid compositions have been made with a maximum water content as low as about 5 percent, thereby reducing the possibility of contaminating surrounding water sensitive formations in the drilling zone.

While the invention has been shown in only five of its forms, it should be apparent to those skilled in the art that it is not thus limited but is susceptible to various changes and modifications without departing from the spirit thereof.

I claim:

1. An oil base drilling fluid composition, comprising:
   an oil base fluid present in the range of about 95 to 75 percent by volume of the drilling fluid composition;
   montan wax having a melting point in the range of about 76° to 120° and an acid number and a saponification number greater than about 100, said montan wax being present in the range from about 5 to 20 pounds per barrel of drilling fluid composition;
   a basic material selected from the group consisting of diethanolamine, alkali metal hydroxides, alkaline earth oxides, and alkaline earth hydroxides capable of forming a soap with said montan wax;
   water present in the range of about 5 to 25 percent by volume of the drilling fluid composition; and
   said oil base drilling fluid composition being characterized by the substantial absence of any dispersed asphalt.

2. An oil base drilling fluid composition, comprising:
   an oil base fluid present in the range of about 95 to 75 percent by volume of the drilling fluid composition;
   montan wax having a melting point in the range of about 76° to 120° C. and an acid number and a saponification number greater than about 100, said montan wax being present in the range from about 5 to 20 pounds per barrel of drilling fluid composition;
   a basic material selected from the group consisting of diethanolamine, alkali metal hydroxides, alkaline earth oxides, and alkaline earth hydroxides capable of forming a soap with montan wax;
   water present in the range of about 5 to 25 percent by volume of the drilling fluid composition; and
   an emulsifying additive, said oil base drilling fluid composition being characterized by the substantial absence of any dispersed asphalt.

3. The oil base drilling fluid composition of claim 2, wherein said basic material is lime.

4. The oil base drilling fluid composition of claim 3, wherein said basic material is present in the range of about 2 to 10 pounds per barrel of drilling fluid composition.

5. The oil base drilling fluid composition of claim 4, wherein said water is present as a saturated brine solution containing 300,000 to 350,000 ppm calcium chloride.

6. An oil base drilling fluid composition having a low solids content for well completion and workover operations, comprising:
   an oil base fluid present in the range of about 95 to 75 percent by volume of the drilling fluid composition;
   a montan wax having a melting point in the range of about 76°-120° C. and an acid number and a saponification number greater than about 100, said wax being present in the range of about 5 to 20 pounds per barrel of drilling fluid composition;
   lime as a basic material capable of forming a soap with said montan wax, said lime being present in the range of about 2 to 10 pounds per barrel of drilling fluid composition;
   brine, present in the range of about 5 to 25 percent by volume of the drilling fluid composition, said brine containing 250,000-300,000 ppm calcium chloride salt;
   an emulsifying additive; and
   pentaerythritol, said oil base drilling fluid composition being characterized by the substantial absence of any dispersed asphalt.

* * * * *